E. M. MASON.
CERTIFICATE.
APPLICATION FILED AUG. 8, 1918.

1,427,161.

Patented Aug. 29, 1922.
2 SHEETS—SHEET 1.

E. M. MASON.
CERTIFICATE.
APPLICATION FILED AUG. 8, 1918.

1,427,161.

Patented Aug. 29, 1922.
2 SHEETS—SHEET 2.

Witness

Inventor
E. M. Mason
By
Attorneys

UNITED STATES PATENT OFFICE.

EDWIN MAHLON MASON, OF CRAWFORDSVILLE, INDIANA, ASSIGNOR TO THE SUPREME TRIBE OF BEN HUR, OF CRAWFORDSVILLE, INDIANA.

CERTIFICATE.

1,427,161.  Specification of Letters Patent.  Patented Aug. 29, 1922.

Application filed August 8, 1918. Serial No. 248,963.

*To all whom it may concern:*

Be it known that I, EDWIN M. MASON, a citizen of the United States, residing at Crawfordsville, in the county of Montgomery and State of Indiana, have invented a new and useful Certificate, of which the following is a specification.

This invention relates to a certificate particularly designed for use by insurance organizations, one of the objects being to provide an insurance certificate having, as an integral part thereof, a draft identifying the certificate by number and which, when the benefit becomes payable, can be cut from the certificate, filled in with the name of the payee, endorsed, and deposited for collection.

Another object is to provide a draft of this character having, in addition to a place for endorsements, a form of affidavit to be filled out and executed by the payee, and a certificate to be filled out and signed by the proper official of the local branch of the organization with which the insured was affiliated, so that when the draft is deposited and subsequently presented for collection it will contain the properly verified information on which the payment of the draft is to be based.

With the foregoing and other objects in view which will appear as the description proceeds, the invention consists of certain novel details of arrangement and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings

Figure 1 is a view of the outside pages of a certificate constituting the present invention.

Figure 2:
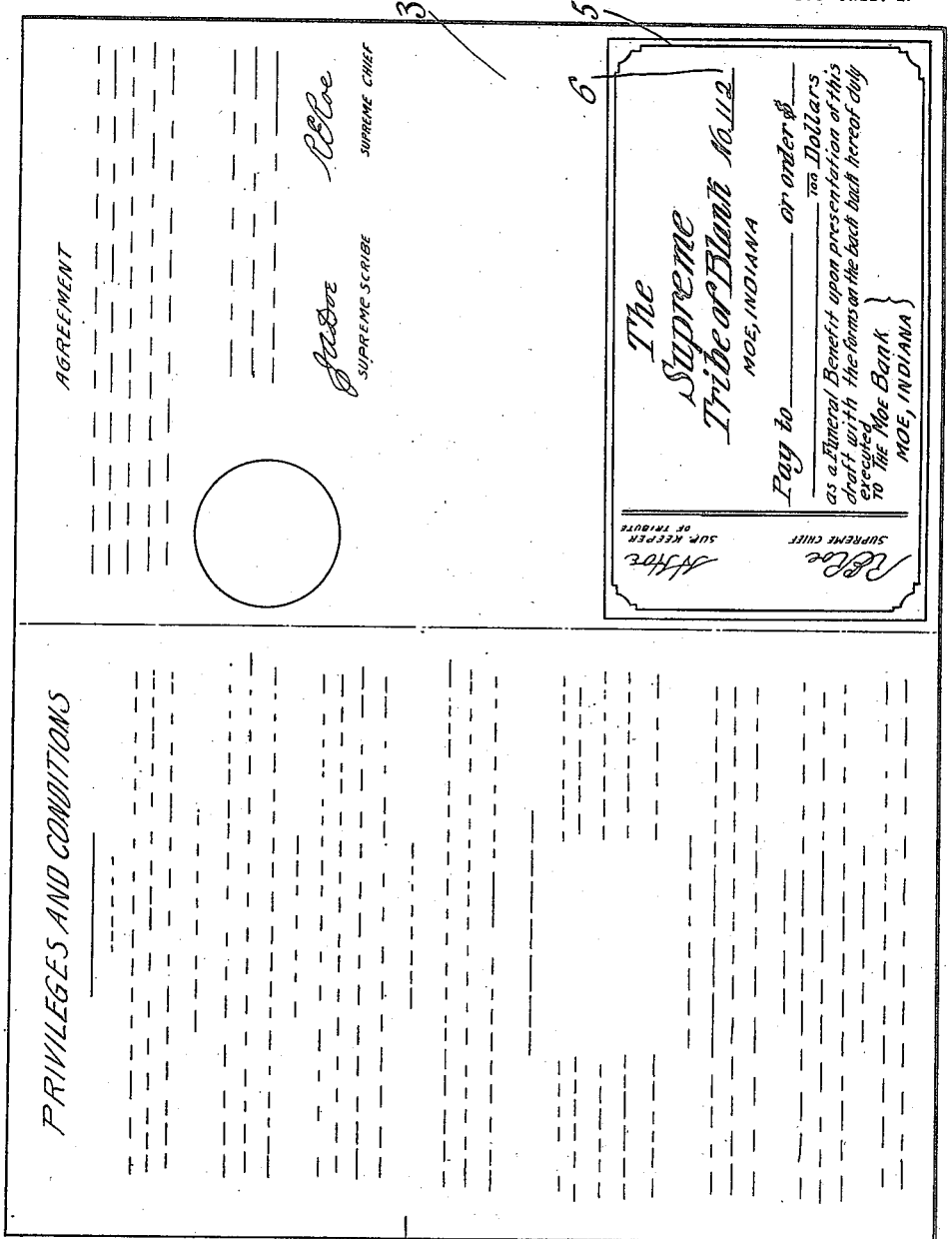
Figure 2 is a view of the inside pages thereof.

Referring to the figures by characters of reference, 1, 2, 3 and 4 designate the four pages of the certificate, and the terms and conditions under which the certificate is issued together with the names of the insured and of the payee printed in the usual manner upon pages 1, 2 and 3, the certificate bearing the seal and the names of the proper officials of the organization. These features are common in many kinds of certificates and it is not deemed necessary to describe or illustrate the same in detail.

Forming a part of the third and fourth pages of the certificate is a draft on the insurance organization bearing the signatures of the proper officers thereof and the face portion of which draft has been indicated at 5. This draft, when printed, or before issuance as a part of the certificate, is provided with a number (shown at 6) which corresponds with the number of the certificate (shown at 7 in Figure 1). The name of the beneficiary is entered in the draft as the payee when the certificate is made out and issued. The amount of the benefit, however, can be left blank to be filled out subsequently to agree with the privileges and conditions set forth in the certificate.

That portion of page 4 of the certificate which is directly back of the face portion of the draft on page 3 is provided at one end with a place for endorsements, as shown at 8, and printed therebelow is a statement of the conditions under which the draft is paid by the organization. Below this statement is a form of affidavit to be filled out as indicated in the drawing, signed by the beneficiary, and executed before a notary public, this affidavit being shown at 9. Below the affidavit is a certificate, 10, to be filled in and signed by the local representative of the organization, certifying to the facts set forth in the affidavit.

When a benefit becomes due, the beneficiary clips from the certificate, the sight draft forming a part thereof, fills in the amount payable under the conditions of the certificate, fills in and executes the affidavit on the back of the draft and then has the representative of the local branch fill in and sign the certificate 10. The draft is then endorsed and deposited for collection.

What is claimed is:—

The combination in a single paper, of an insurance certificate having an identifying character and a draft having a duplicate of said character, said draft adapted to be removed from the certificate and presented to a bank for payment like an ordinary draft, there being means for indicating the points along which the draft is to be separated from the certificate, said certificate containing a statement of certain conditions upon which the payment of the insurance is dependent, said conditions including a promise to pay a definite specified portion of the insurance as a death benefit immediately upon the death of the insured and without other proof of death than the affidavit of the beneficiary verified by the certificate of the agent of the payor, the said draft being drawn for the amount of said death benefit and payable upon the death of the insured, there being arranged upon the back of the draft, and within the area to be removed from the certificate, an affidavit and a certificate, said affidavit to be executed by the beneficiary prior to presentation for payment and setting forth that the conditions of the certificate have been complied with, and said certificate to be signed by the agent of the payor prior to presentation of the draft for payment and vouching for the truthfulness of the facts in the certificate.

In testimony that I claim the foregoing as my own, I have hereto affixed my signature in the presence of two witnesses.

EDWIN MAHLON MASON.

Witnesses:
S. E. VORIS,
WM. W. GOLTRA.